(12) United States Patent
Morrow

(10) Patent No.: US 6,607,585 B2
(45) Date of Patent: Aug. 19, 2003

(54) RAW NATURAL GAS PROCESSING SYSTEM AND METHOD OF PROCESSING RAW NATURAL GAS

(76) Inventor: David Morrow, P.O. Box 60480, Midland, TX (US) 79711-0480

( * ) Notice: Subject to any disclaimer, the term of this patent is extended or adjusted under 35 U.S.C. 154(b) by 0 days.

(21) Appl. No.: 09/745,294

(22) Filed: Dec. 20, 2000

(65) Prior Publication Data

US 2002/0007733 A1 Jan. 24, 2002

Related U.S. Application Data

(63) Continuation of application No. 09/295,291, filed on Apr. 20, 1999, now abandoned, which is a continuation-in-part of application No. 08/916,169, filed on Aug. 21, 1997, now abandoned, which is a continuation of application No. 08/798,599, filed on Feb. 11, 1997, now abandoned.

(51) Int. Cl.[7] .............................................. B01D 53/14
(52) U.S. Cl. ............................ 95/160; 95/163; 95/164; 95/166; 95/169; 95/177; 95/181; 95/183; 95/184; 95/191; 95/235; 95/236; 95/237; 96/234; 96/242
(58) Field of Search ................. 95/237, 238, 239, 95/159, 160, 161, 163, 165, 169, 172, 177, 174, 184, 187, 191, 192, 207, 208, 164, 181, 183, 166, 236; 96/237, 238, 239, 234, 242, 295

(56) References Cited

U.S. PATENT DOCUMENTS

| | | | | |
|---|---|---|---|---|
| 2,943,703 A | * | 7/1960 | Thayer | 95/191 |
| 3,236,029 A | * | 2/1966 | Afdahl et al. | 95/184 |
| 4,273,620 A | * | 6/1981 | Knobel | 95/191 |
| 5,536,303 A | * | 7/1996 | Ebeling | 95/169 |

* cited by examiner

*Primary Examiner*—Duane S. Smith
(74) *Attorney, Agent, or Firm*—David G. Henry

(57) ABSTRACT

An improved method and structure for purification of an acid gas stream by using raw fuel gas as a stripper to remove the BTEX and VOCs from the liquid amine stream. The improved method is particularly useful for purification of acid gas streams with BTEX contaminant levels in excess of environmentally acceptable levels for standard processing. Raw fuel gas is utilized at moderate temperatures and pressures, the uptake of BTEX and VOCs reduces the level of these compounds in the waste amine stream to environmentally acceptable levels, and the remaining contaminants may then be dealt with by ordinary means. Levels of $H_2S$ and $CO_2$. in the liquid amine stream are also reduced.

4 Claims, 1 Drawing Sheet

RAW NATURAL GAS PROCESSING SYSTEM AND METHOD OF PROCESSING RAW NATURAL GAS

This is a continuation application with respect to U.S. application Ser. No. 09/295,291, filed Apr. 20, 1999, now abandoned which was a continuation-in-part of U.S. application Ser. No. 08/916,169, filed Aug. 21, 1997, now abandoned, which, in turn, was a continuation of U.S. application Ser. No. 08/798,599, now abandoned. Priority for this application is claimed, pursuant to 35 U.S.C. § 120, with respect to the preceding parent applications.

BACKGROUND OF THE INVENTION

1. Field of the Invention

This invention relates to the large scale purification of raw natural gases, specifically separating contaminates from amine. Purification plant operators have ordinary skill in the art to which this invention relates.

2. Description of the Related Art

Natural gas, as it is captured from naturally occurring deposits, is composed primarily of methane ($CH_4$) and ethane ($C_2H_6$). Certain contaminants are naturally present in the gas, and must be removed prior to delivery of the purified gas for private or commercial use. These contaminants include inorganic carbon dioxide ($CO_2$), hydrogen sulfide ($H_2S$), as well as organic compounds, including light aliphatic hydrocarbons (propanes, butanes, pentanes, and their isomers), aliphatic hydrocarbons—those containing six or more carbon atoms, and aromatic hydrocarbons.

The aromatic hydrocarbon impurities in raw natural gas consist of benzene, and various forms of alkylbenzenes, including ethylbenzene, toluene, and xylenes. These compounds are referred to collectively as "BTEX." The removal and disposition of these BTEX compounds is particularly problematic (and extremely important) as these compounds are known to be carcinogenic, even in small quantities, and are regulated as such by various governmental agencies. See Ramaratnum, paragraph 1. (Ramaratnum, Munkund; Cartwright, G. Tom, Graham, James R.; "Recovery of BTEX and other VOCs in the refinery;" *Hydrocarbon Technology International Quarterly*; Autumn 1995; p. 96-9. In order to meet these strict environmental standards, an effective method of removing and destroying the contaminants from these impure or "sour" gases is needed.

Removal and disposal of the BTEX components, as well as the aliphatic compounds with more than six carbon atoms, referred to as volatile organic compounds ("VOCs")—also known have some carcinogenic character—is customarily accomplished by two processes: vent gas incineration and carbon bed absorption. Both processes begin with stripping the BTEX components and VOCs from the natural gas stream by use of a liquid amine solution. The amine is then carried to a desorption zone. This process is similar to that described in FISCH, (U.S. Pat. No. 4,025,322 May 24, 1977).

In the vent gas incineration process, the BTEX and VOCs are combusted at temperatures in excess of 1200° F. An incinerator exposes the vent gas stream to a direct flame that is produced by igniting fuel gas, providing excess air via a forced draft fan. The products of the combustion are carbon dioxide and water vapor, both of which are environmentally acceptable alternatives to BTEX emissions.

Vent gas incineration solves the problem of removing and disposing of BTEX components in the vent gas stream, but can be cost prohibitive from an initial investment and fuel usage standpoint, since this conventional process requires specialized, expensive equipment, and dramatically increases annual fuel usage of the purification plant. Also, vent gas incineration is disruptive to project planning, since it usually requires an approximately six month long permitting process to obtain a federal permit for the incinerator.

A second conventional process involves removing the BTEX and VOC contaminants from the amine stream and passing them through a bed of granular activated carbon (GAC) which adsorbs the harmful organic compounds. This method was described in Ramaratnum. The GAC may then be regenerated with steam to liberate the adsorbed BTEX components, which are then cooled and captured as solid products. Disadvantages to this method include an extremely high installation cost, a high energy cost required to dehumidify the waste gas stream, and problems associated with disposal of the solid hazardous waste residue which is produced in the process. (See Ramaratnum, p. 99).

It has been suggested that the present invention is rendered obvious by the presence, in the prior art, of certain dehydration processes in the petrochemical industries. To address and correct this concern, the discussion of Appendix A is provided.

SUMMARY OF THE INVENTION

An object of this invention is to provide an economical and feasible method and associated equipment for purification of raw acid gas streams by removing and destroying harmful aromatic hydrocarbon and heavy aliphatic hydrocarbon contaminants, and lowering levels of $H_2S$ and $CO_2$.

A further object is to prevent wholesale contamination to the environment from large accumulations of toxic waste material composed of harmful carcinogenic compounds by providing a safe, effective, reliable, and inexpensive manner in which to safely destroy those toxic compounds into environmentally safe products.

Further objects are to achieve the above objects with a device that is sturdy, compact, durable, lightweight, simple, safe, efficient, versatile, ecologically compatible, energy conserving, and reliable, yet inexpensive and easy to manufacture, install, operate, and maintain.

Other objects are to achieve the above objects with a method which is rapid, versatile, ecologically compatible, energy conserving, efficient, and inexpensive, and does not require highly skilled personnel to install, operate, and maintain.

In satisfaction of these and related objects, this invention provides an improved method and structure for purification of an acid gas stream by using raw fuel gas as a stripper to remove the BTEX and VOCs from the liquid amine stream. The improved method is particularly useful for purification of acid gas streams with BTEX contaminant levels in excess of environmentally acceptable levels for standard processing.

Applicant has discovered that if raw fuel gas is utilized at moderate temperatures and pressures, as discussed below, the uptake of BTEX and VOCs reduces the level of these compounds in the waste amine stream to environmentally acceptable levels, and the remaining contaminants may then be dealt with by ordinary means. The invention is also effective at reducing the levels of $H_2S$ and $CO_2$ in the liquid amine stream.

Applicant has also discovered that the BTEX and VOCs liberated by this process may be carried away with the stripping gas and burned in the heater used to provide energy to drive the purification process. This has the advantages of destroying the contaminants in an environmentally acceptable manner, to produce environmentally acceptable alternatives. Burning the stripping gas in the process heater also has the advantage of lowering the cost of the purification process because the stripping gas is recycled as fuel gas to fuel the process.

The improved process is based on the preference of BTEX components for the gas phase as the pressure is lowered in accordance with Henry's law equation: $Y=HX/P$ where Y is the concentration of the component in the gas phase, H is a standard physical Henry's law constant, X is the concentration of the component in the liquid phase, and P is the pressure.

The specific nature of the invention, as well as other objects, uses, and advantages thereof, will clearly appear from the following description and from the accompanying drawings, the different views of which are not necessarily scale drawings.

CATALOG OF ELEMENTS

Figure 1:
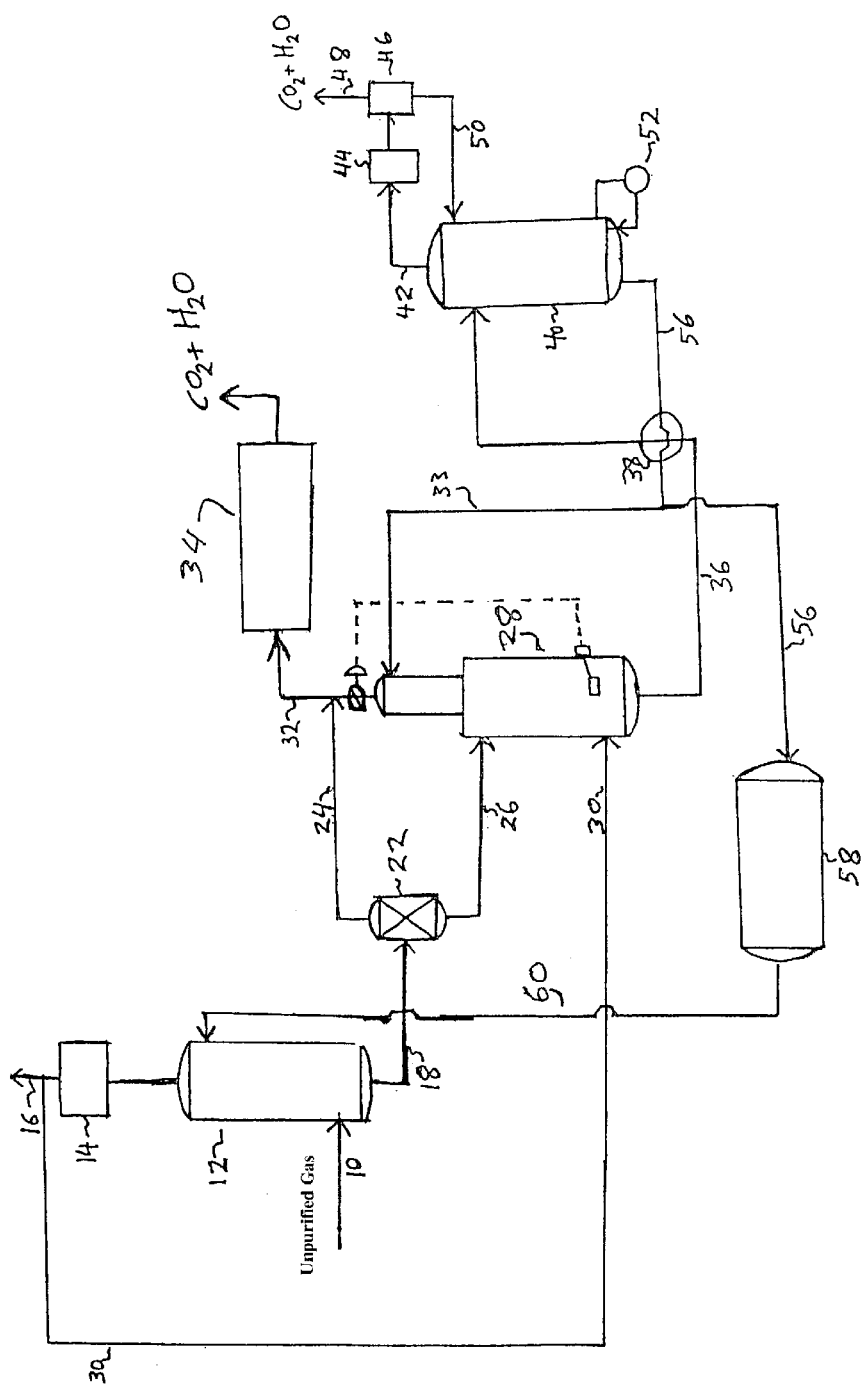
FIG. 1 is a representation of an absorption/stripping process, utilized in the removal of contaminants from a stream of a raw gas, such as natural gas.

As an aid to correlating the terms to the exemplary drawing(s), the following catalog of elements is provided:
10 Raw gas input
12 Liquid amine absorption column
14 Scrubber
16 Purified gas manifold
18 Contaminated liquid amine stream
22 Amine flash vessel
24 Flash vessel waste gas manifold
26 Flash vessel liquid amine stream
28 BTEX stripper
30 Fuel/stripping gas input
32 BTEX stripper waste gas manifold
33 Lean amine input
34 Process heater
36 BTEX stripper liquid amine stream
38 Amine cross-exchanger
40 Liquid amine regenerator
42 Regenerator waste gas manifold
44 Cooler
46 Accumulator
48 Waste gas vent
50 Return
52 Reboiler
56 Purified liquid amine return
58 Liquid amine storage tank
60 Amine supply to purification process

DETAILED DESCRIPTION OF THE PREFERRED EMBODIMENT

In order to describe the invention in greater detail, reference is made to the accompanying drawings. The values given herein relating to temperatures, pressures, compositions, etc., should be considered merely exemplary and not as delimiting or restricting of the invention.

Looking at FIG. 1, a flowchart of the improved process may be seen. Raw or "sour" natural gas, containing impurities including $H_2S$, $CO_2$, and a significant amount of BTEX components and VOCs, in line 10 enters the process at absorption column 12 ("liquid amine-based natural gas contaminant absorption means"), which contains a liquid amine absorbent solution. Empirical results indicate that the invention works well with an aqueous solution of Diethanolamine (DEA) or methyldiethanolamine (MDEA), or with an aqueous solution containing both MDEA and DEA. Concentrations of the MDEA solution or the DEA solution are ideally between about 25–45% amine (by weight), while concentration for the mixture is about 30% DEA and 20% MDEA (weight). It should be understood that the process could be conducted with other concentrations of MDEA or DEA, and would also work with solutions containing other amines.

A representative test case gave successful results with an inlet flow rate of raw feed gas of about 73.9 MSCFD (million standard cubic feet daily), at a pressure of around 1000 p.s.i.g., and temperature between about 120–140° F. An amine absorption column of around 10–20 trays was used, with a contact time of about 2.5 seconds per tray.

Purified or "sweet" gas leaves the column through outlet or manifold 16 ("sweet gas delivery means"), passing through scrubber 14. The purified gas at this point meets environmentally and commercially accepted standards of purity.

The liquid amine, containing most of the $H_2S$ and $CO_2$, as well as some of the BTEX and VOC components ("contaminated liquid amine") is represented as stream 18. This stream enters the flash tank 22. The temperature of the liquid amine is in the range of about 120–180° F. as a result of the heat of reaction of the amine with $CO_2$. The flash pressure is maintained in the range of about 80 to 100 p.s.i.g. and consequently, some dissolved methane, as well as some $CO_2$, $H_2S$, BTEX, and VOC components are released as a waste gas. The waste gas liberated in the amine flash vessel is carried away through manifold 24, to be destroyed by burning in process heater 34.

Up to this point, the process as described is well known in the prior art, and is easily accomplished according to developed principals and specifications. Applicant's improvement is represented in the steps which follow.

Upon leaving the flash vessel 22, the contaminated liquid amine is carried by flash vessel amine stream 26 to desorption zone, or BTEX stripper 28. This stripper is constructed of two packed columns; a smaller column stacked coaxially on top of a larger column. The contaminated amine from stream 26 enters the top of the larger column, while stripping gas is introduced through the larger column from the bottom, and disbursed for even flow throughout the column.

In the BTEX stripper, much of the remaining absorbed BTEX and VOCS, as well as portions of absorbed $H_2S$ and $CO_2$ contaminants are stripped by introduction of a combustible stripping gas ("stripper means") through the liquid amine. Because of economical considerations and due to its ready availability, purified natural gas is used in the process, and a side path from the purified gas line 16 supplies stripping gas to the BTEX stripper through stripper input 30 ("sweet gas recirculation means").

Waste gas liberated by the BTEX stripper consists of the raw stripping gas, along with the BTEX and VOC contaminants and $CO_2$ removed from the liquid amine stream. The low pressure, warm temperature, and introduction of the stripping gas favor transfer of the contaminants into the gas phase in the BTEX stripper. Such temperatures are around 150° F., with pressures in the neighborhood of 80 p.s.i.g.

The flow rate through the BTEX stripper 28 is established and maintained by a liquid level controller located in the bottom of the stripper column. As the liquid level rises in the bottom of the column, a valve in the BTEX stripper waste gas manifold is closed, which increases the operating pressure in the stripping column, thus forcing liquid out of the column and maintaining a constant level. Because of this discrete method of maintaining the flow rate, the BTEX stripper may be inserted into an existing plant operation with very little modification to the prior structure. The liquid amine flows through the tower without interruption.

The upper column on the BTEX stripper contains an additional volume of packing. As the stripping gas and BTEX flow through this upper column, lean amine is loaded onto the column from the top through lean amine input 33. This lean amine acts to reabsorb any $CO_2$, which is liberated in the BTEX stripper. The stripping gas and BTEX is removed from the column by stripper waste gas manifold 32 ("BTEX stripper waste gas conveyance means"). This manifold joins with the flash vessel waste gas manifold 24, and the two waste gas streams are fed into process heater 34 ("process heater means"), where they are incinerated to produce energy that drives the process. A specific advantage to this method is that it recycles a harmful waste product into energy required onsite.

After leaving the BTEX stripper, the liquid amine stream 36 carries a level of BTEX and VOC contaminants well within levels for ordinary processing. The amine stream is carried through amine cross exchanger or heat exchanger 38, and into amine regenerator 40. Here, the liquid amine is purified to remove any remaining $H_2S$, BTEX and VOCS, as well as large amounts of $CO_2$. These waste products are carried through waste gas stream or manifold 42, through cooler 44 and accumulator 46 and are vented into the atmosphere at vent 48. Liquid amine carried with the waste gas stream is collected in the accumulator, and returned to the regenerator via return 50. The purification process in the regenerator is driven by reboiler 52.

It will be understood that although controlled atmospheric venting of the remaining trace amounts of BTEX and VOCs liberated by the regenerator is one of the most economical disposal means, other means of disposal could be employed. Such means include controlled incineration of the regenerator waste gas stream, and capture or recovery of the BTEX contaminants in the desorption zone by use of granular activated carbon (GAC).

Following purification in the regenerator, the purified liquid amine stream is carried via purified liquid amine return 56, through lean/rich exchanger 38, to liquid amine supply tank 58. From the supply tank, the liquid amine is recirculated into the purification process by supply stream 60.

Because this process is based on Henry's Law, as discussed above, and because Henry's constant increases as temperature increases, an alternate placement of BTEX stripper 28 would seem to be immediately downstream from lean/rich exchanger 38 for maximum BTEX component removal. However, Applicant has discovered that placement of the stripper at that location has the undesirable side effect of liberating excess amounts of dissolved $CO_2$ from the liquid amine stream, which would result in a BTEX stripper waste stream which could not be ignited due to high $CO_2$ content.

Applicant has discovered that this improved process is particularly useful in high flow rate systems with relatively high concentrations of BTEX contaminants. For example, according to Applicant's experimental results, a 600 gallon per minute amine unit, designed to treat a 150 MMSCFD gas source with 867 ppm (by volume) of BTEX contaminants could be modified to perform the above process. With these conditions, based on computer simulation and modeling, the amine in purification column 12 would absorb a level of 14.325 pounds per hour of BTEX components, with a treating pressure of 1000 p.s.i.g. Current legal regulations allow only 25 tons per year (6.25 pounds per hour) of such BTEX components to be vented to the atmosphere. It can be seen that this limit would be quickly exceeded under the above conditions with the present treating protocols.

With the addition of the BTEX stripper to the treating loop, the liquid amine stream leaving the BTEX stripper 36 would carry a level of only 4.03 pounds per hour of BTEX components. This level is well within acceptable environmental limits, and could be vented according to means conventional disposal methods.

By the above specifications and drawings, one with ordinary skill in the art will understand how to make and use the invention as described. At this time the description above includes the best mode known to the inventor of carrying out his invention.

I claim:

1. An apparatus for processing raw natural gas for removing undesirable constituents comprising:

a raw natural gas intake conduit for receiving raw natural gas containing unacceptably high levels of undesirable constituents, including BTEX, $H_2S$, $CO_2$, BTEX and VOC, constituents;

aqueous amine-based natural gas contaminant absorption means for receiving said raw natural gas from said raw natural gas intake conduit and for first stripping substantial portions of said $H_2S$, $CO_2$, BTEX and VOC constituents from said raw natural gas;

sweet gas delivery means attached to said aqueous amine-based natural gas contaminant absorption means for delivering a first portion of sweet gas, produced by said first stripping of said $H_2S$, $CO_2$, BTEX and VOC from said raw natural gas, from said processing facility to storage and transportation facilities;

contaminated aqueous amine collection means, attached to said aqueous amine-based natural gas contaminant absorption means, for collecting contaminated aqueous amine, which carries such $H_2S$, $CO_2$, BTEX and VOC constituents as are absorbed from said raw natural gas, from said aqueous amine-based natural gas contaminant absorption means;

BTEX stripper means, in fluid communication with said contaminated aqueous amine collection means for receiving said contaminated aqueous amine from said contaminated aqueous amine collection means in a manner for interacting with stripping means for second stripping $H_2S$, $CO_2$, BTEX and VOC contaminants from said contaminated aqueous amine;

sweet gas recirculation means attached in fluid communication with said aqueous amine-based natural gas contaminant absorption means and with said BTEX stripper for conveying a second portion of said sweet gas to said BTEX stripper, said sweet gas recirculation means being attached to said BTEX stripper whereby said second measure of said sweet gas acts as said stripping means in said BTEX stripper for effecting said second stripping of said $H_2S$, $CO_2$, BTEX and VOC contaminants from said contaminated aqueous amine;

lean amine injection means in fluid communication with an upper portion of said BTEX stripper for injecting lean amine into said upper portion of said BTEX stripper and interacting with BTEX stripper waste gas as is produced from said second measure of said sweet gas as it flows upwardly through said BTEX stripper, such introduction of said lean amine for absorbing $CO_2$ from said BTEX stripper waste gas and rendering said BTEX waste gas more suitable as a combustible fuel;

BTEX stripper waste gas conveyance means for collecting and conveying BTEX stripper waste gas produced by said second stripping in said BTEX stripper from said BTEX stripper after exposure to said lean amine in said upper portion of said BTEX stripper; and process heater means for providing heat for heat-requiring processes occurring through operation of said natural gas processing facility, said process heater means operating through combustion of combustible fuel, said process heater means being connected with said BTEX stripper waste gas conveyance means for receiving substantially all of said BTEX stripper waste gas produced through operation of said BTEX stripper and combusting said BTEX stripper waste gas whereby said BTEX stripper waste gas serves as said combustible fuel for said process heater means.

2. The apparatus of claim 1 further comprising amine flash vessel means intervening said aqueous amine-based natural gas contaminant absorption means and said BTEX stripper means and residing in-line with said contaminated aqueous amine collection means whereby effluent contaminated aqueous amine from said amine flash vessel means flows to said BTEX stripper without further processing of said contaminated aqueous amine after passage through said amine flash vessel means such as would substantially elevate the temperature of said effluent contaminated aqueous amine to a level for releasing such levels of $CO_2$ from said contaminated aqueous amine in said BTEX stripper waste gas as to render said BTEX stripper waste gas less suitable as said combustible fuel for said process heater means.

3. A process for purifying raw natural gas containing unacceptably high levels of undesirable constituents, including BTEX, $H_2S$, $CO_2$, BTEX and VOC, constituents and for operating a natural gas purification facility comprising the steps of:

collecting a quantum of raw natural gas into a raw natural gas intake conduit;

depositing said quantum of raw natural gas into aqueous amine-based natural gas contaminant absorption means for first stripping substantial portions of $H_2S$, $CO_2$, BTEX and VOC constituents from said raw natural gas;

delivering for conveyance to storage and transportation facilities a first portion of sweet gas, produced by said first stripping of said $H_2S$, $CO_2$, BTEX and VOC from said raw natural gas, via sweet gas delivery means attached to said aqueous amine-based natural gas contaminant absorption means;

through use of contaminated aqueous amine collection means which are attached to said aqueous amine-based natural gas contaminant absorption means, collecting contaminated aqueous amine, which carries such $H_2S$, $CO_2$, BTEX and VOC constituents as are absorbed from said raw natural gas, from said aqueous amine-based natural gas contaminant absorption means;

second stripping $H_2S$, $CO_2$, BTEX and VOC contaminants from said contaminated aqueous amine through use of BTEX stripper means, said BTEX stripper means being in fluid communication with said contaminated aqueous amine collection means, configured for receiving said contaminated aqueous amine from said contaminated aqueous amine collection means, and configured in a manner for utilizing a stripping gas for effecting said second stripping, said second stripping including the introduction into said BTEX stripper as said stripping gas a second quantum of said sweet gas via sweet gas recirculation means which receives said second quantum of sweet gas as is produced through operation of said aqueous amine-based natural gas contaminant absorption means;

injecting lean amine using lean amine injection means in fluid communication with an upper portion of said BTEX stripper for injecting lean amine into said upper portion of said BTEX stripper and interacting with BTEX stripper waste gas as is produced from said second measure of said sweet gas as it flows upwardly through said BTEX stripper, such introduction of said lean amine for absorbing $CO_2$ from said BTEX stripper waste gas and rendering said BTEX stripper waste gas more suitable for use as combustible fuel; and conveying BTEX stripper waste gas, produced by said second stripping in said BTEX stripper, from said BTEX stripper to process heater means configured for providing heat for heat-requiring processes occurring through operation of said natural gas processing facility, said BTEX stripper waste gas being utilized as a component of fuel for said process heater means.

4. The process of claim 3 wherein said contaminated liquid amine collection means are configured for introducing said contaminated liquid amine into said BTEX stripper at a temperature not substantially in excess of such temperature as results from action of amine flash vessel means upon said contaminated liquid amine, said amine flash vessel means intervening said liquid amine-based natural gas contaminant absorption means and said BTEX stripper means and residing in-line with said contaminated liquid amine collection means, whereby sufficiently little $CO_2$ is liberated from said contaminated liquid amine into a said BTEX stripper waste gas as to render said BTEX stripper waste gas readily combustible in said process heater means.

* * * * *